United States Patent [19]
Parr et al.

[11] Patent Number: 5,887,031
[45] Date of Patent: Mar. 23, 1999

[54] SYMBOL TIMING MAINTAINANCE TO ENABLE LOW DUTY CYCLE RECEIVER OPERATION

[75] Inventors: Michael Parr, San Diego; Jim Hobza, Carlsbad, both of Calif.

[73] Assignee: Hughes Electronics Corporation, El Segundo, Calif.

[21] Appl. No.: 790,406

[22] Filed: Jan. 29, 1997

[51] Int. Cl.$^6$ .......................... H04B 17/00; H04L 27/06
[52] U.S. Cl. ........................ 375/227; 375/228; 375/224; 375/344
[58] Field of Search ................................ 375/227, 228, 375/355, 224, 225, 344, 346, 326, 285

[56] References Cited

U.S. PATENT DOCUMENTS

| | | | |
|---|---|---|---|
| 5,440,590 | 8/1995 | Birchler et al. | 375/347 |
| 5,566,214 | 10/1996 | Kroeger et al. | 375/355 |
| 5,619,524 | 4/1997 | Ling et al. | 375/200 |
| 5,644,599 | 7/1997 | Hess | 375/227 |
| 5,659,576 | 8/1997 | Critchlow et al. | 375/219 |

Primary Examiner—Chi H. Pham
Assistant Examiner—Khai Tran
Attorney, Agent, or Firm—John T. Whelan; Michael W. Sales

[57] ABSTRACT

A system for symbol timing maintenance in a communications receiver, in one embodiment, employs a receive channel, including a demodulator and an analog-to-digital converter for generating a plurality of samples; a symbol timing statistic generator for generating a symbol timing statistic in response to a portion of the plurality of samples; a noise estimator for generating an estimate of a noise level in response to the plurality of samples; a reception interval determiner for determining a reception interval; and a control loop for generating a signal indicative of symbol timing error. In an alternative embodiment, the system may, in addition to or instead of the noise estimator, and reception interval determiner, employ a bandwidth tuner for tuning a bandwidth of the control loop in response to the signal indicative of the symbol timing error having been generated.

31 Claims, 5 Drawing Sheets

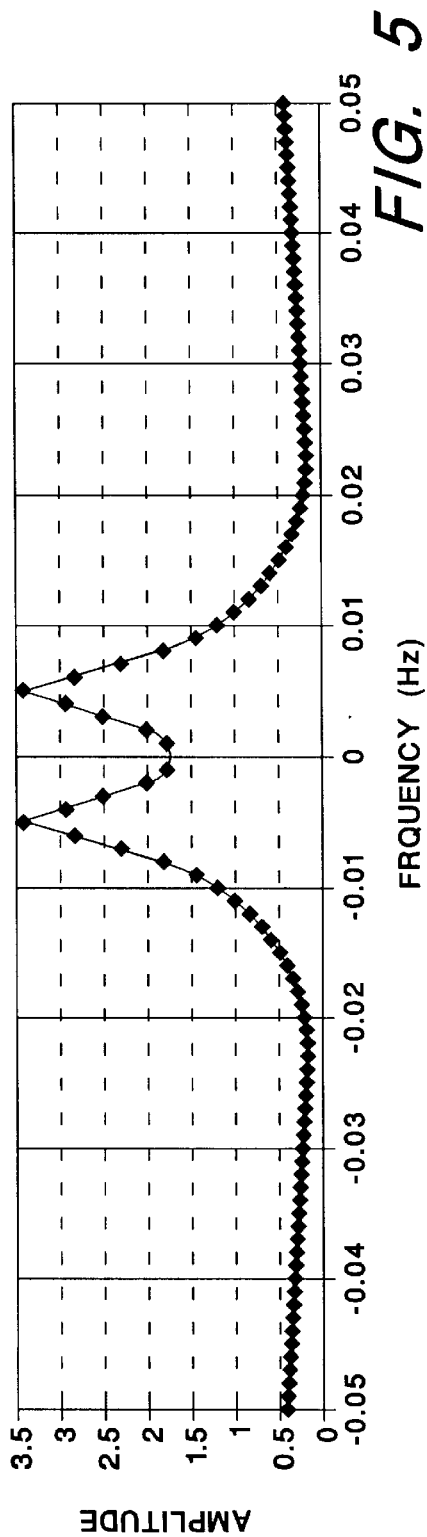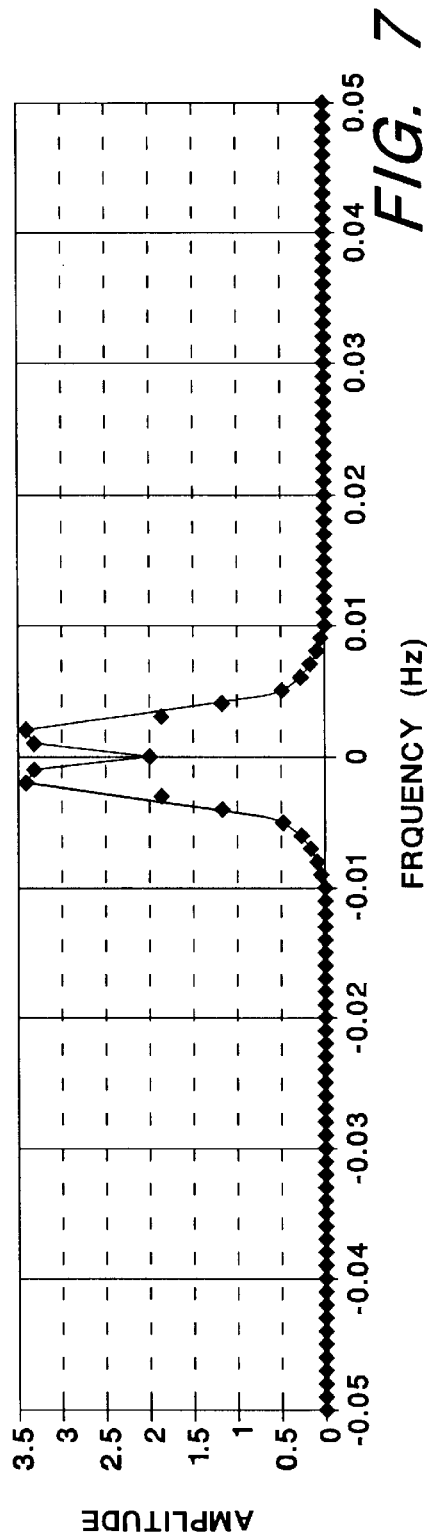

SYMBOL TIMING MAINTAINANCE TO ENABLE LOW DUTY CYCLE RECEIVER OPERATION

BACKGROUND OF THE INVENTION

The present invention relates to symbol timing, and more particularly to symbol timing maintenance in a communications receiver. Even more particularly, the present invention relates to symbol timing maintenance in a receiver to enable low duty cycle receiver operation.

In mobile communications systems, mobile units, or subscriber units, are typically powered by battery power sources, such as Nickel cadmium, Nickel Metal Hydride, Lithium, Lead Acid, Carbon Zinc, or Alkaline Batteries. These battery power sources provide a limited supply of power to the subscriber unit before being depleted, and then need to be recharged or replaced. As a result, this limited supply of power should be utilized in as highly efficient of a manner as possible, minimizing times and amounts of power consumption not essential to operation of the subscriber unit, while still allowing performance of tasks necessary to subscriber unit operation.

When the subscriber unit is not "in use", i.e., is not actively being used by a user to communicate, the subscriber unit generally monitors a channel for "pages". These "pages" may indicate to the subscriber unit that there is an incoming call (in which case the pages can be referred to as call initiation messages), and can be used by the subscriber unit to initiate, for example, the ringing of a ringer. Alternatively, these "pages" may indicate to the subscriber unit the receipt of a page, in which case the subscriber unit initiates a beeping tone or vibrates, in order to signal to a user that he or she has been paged.

In order to maximize power usage efficiency within the subscriber unit, the subscriber unit is preferably put into a "stand by" mode, during which transceiver and processing sections of the phone are shut down, except for a clock that is used to "wake up" the subscriber unit periodically, whenever possible. For example, the subscriber unit may be put in "stand by" mode between periodic time slots during which the subscriber unit must monitor the channel for "pages." Prior to such periodic time slots, the subscriber unit is "awakened." Such "waking up" of the subscriber unit is necessary so that the subscriber unit can "listen" to the control channel for incoming page signals during the periodic time slots. In the event that the system in which the subscriber unit operates is required to periodically repeat "pages," it may even be possible and desirable to "wake up" the subscriber unit only during selected ones of the periodic time slots, such as during every other one, or every third one of the periodic time slots. While this may result in some delay in receiving incoming pages, for, for example, three to ten seconds, the concomitant power savings may, under some circumstances, easily justify this trade off.

Thus, in battery-powered wireless communications systems, it is highly desirable that "stand-by" time be maximized in mobile or subscriber units and that "awake" or active mode time be minimized. In order to maximize standby time, the subscriber unit must spend as little time as possible in the active mode, while still periodically monitoring "pages," e.g., call initiation messages.

To this end, the protocol used to transmit the "pages" should transmit such "pages" during determinable periods spaced apart in time as far as possible, and as short as possible in length. These periods may be spaced in time at regular intervals or their spacing may be more complex.

The subscriber unit preferably "wakes up" as infrequently as possible while still allowing it to receive the "pages" at a reasonable interval, in accordance with the subscriber unit's particular application. The periods of time during which the subscriber unit remains in the active state should be minimized, i.e., activities such as power-up-style reacquisition of accurate signal timing should be avoided.

Problematically, however, factors such as imprecision in internal clock rate within the subscriber unit, imprecision in clock rate in a base station, drift in clock rate due, for example, to temperature, and the like cause inaccuracies in timing between the base station and the subscriber unit over time. These inaccuracies limit the amount of time during which the subscriber unit can "standby" and the shortness of periods during which the subscriber unit remains active. These inaccuracies have also required heretofore that the subscriber unit periodically perform power-up-style timing reacquisition in order to reacquire accurate timing synchronization with, for example, a base station. Unfortunately, both the limitation on the time during which the subscriber unit can "standby" and the need for periodic reacquisition, result in higher power consumption and shorter battery life than would otherwise be attainable.

The present invention advantageously addresses the above and other needs.

SUMMARY OF THE INVENTION

The present invention advantageously addresses the needs above as well as other needs by providing an approach to symbol timing maintenance in a receiver to enable low duty cycle receiver operation.

In one embodiment, the invention can be characterized as a system for symbol timing maintenance in a communications receiver. The system has a receive channel, including a demodulator and an analog-to-digital converter for demodulating and digitizing a received signal, respectively, and for generating a plurality of samples in response thereto; and a symbol timing statistic generator for generating a symbol timing statistic in response to a portion of the plurality of samples. The symbol timing statistic generator being coupled to the receive channel. The system also has a noise estimator, which is coupled to the receive channel, for generating an estimate of a noise level in response to the plurality of samples; a reception interval determiner for determining a reception interval; and a control loop for generating a signal indicative of symbol timing error. The control loop is coupled to the symbol timing statistic generator and to the reception interval determiner.

In another embodiment, the invention can be characterized as a system for symbol timing maintenance in a communications receiver wherein the system employs the receive channel; the symbol timing statistic generator; the control loop; and a bandwidth tuner for tuning a bandwidth of the control loop in response to the signal indicative of the symbol timing error having been generated.

BRIEF DESCRIPTION OF THE DRAWINGS

The above and other aspects, features and advantages of the present invention will be more apparent from the following more particular description thereof, presented in conjunction with the following drawings wherein:

FIG. 5 is a graph illustrating an example of frequency response of the embodiment of FIG. 1;

FIG. 7 is a graph illustrating frequency response of the control loop of FIG. 4 with the loop bandwidth $K_{bw}$ set to 0.1.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
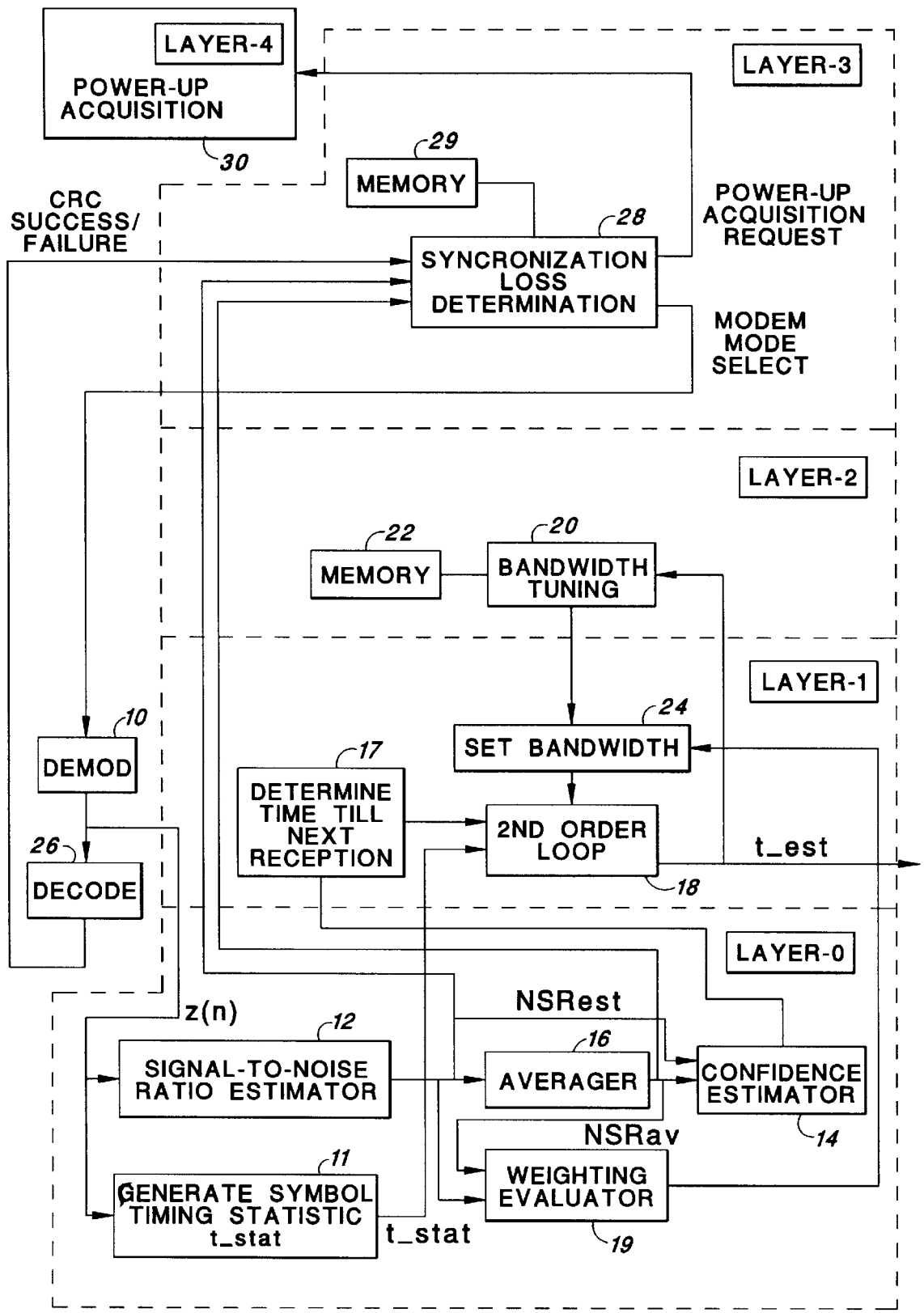
FIG. 1 is a block diagram of a timing control system in accordance with one embodiment of the present invention.

Referring first to FIG. 1, shown is a block diagram of a timing control system in accordance with one embodiment of the present invention. The embodiment employs five layers, numbered zero (0) through four (4). Layer four is a "power-up"-style re-acquisition request layer; layer three examines side information to determine whether synchronization has been lost, and, if so, responds by either (a) setting a modem into a resynchronization mode, or (b) sending a message to external code requesting that "power-up"-style reacquisition (layer four) be performed; layer two determines an appropriate bandwidth for a second order loop; layer one passes a statistic (t_stat) through the second order loop, i.e., a symbol timing control loop; and layer zero estimates a statistic (t_stat), and a number of categories of the side information.

Referring to layer zero, at the output of a matched filter and receiver (i.e., modem), complex fractionally-spaced (Ts/2) samples can be recorded. Such samples can be observed in a differential sense, such that each resultant symbol provides a phase reference for a subsequent symbol. For transitions of plus or minus 135° (due to appropriate data), the fractionally-spaced samples should (on average) have a phase of 67.5°. Differences above and below 67.5° are accumulated by a symbol timing statistic generator and a statistic (t_stat) is generated in response to such accumulation. The statistic is an estimate of the error in symbol timing based on observations during a single burst and is monotonically related to symbol timing error over the single burst.

Performance of this embodiment can be characterized by (a) a relationship the statistic provides to actual time error, and (b) variance of the statistic as a function of signal-to-noise ratio (SNR) (Note that "system filtering" ensures that the fractionally-spaced samples are not consistently placed, even in a no-noise environment. Thus, even at high signal-to-noise ratios, the variance is non-zero. System filtering involves filtering to control spectral occupancy of the signal. Such filtering, which is typically square-root-raised-cosine filtering, only attempts to provide a single instant per symbol at which the received signal is affected by only one transmitted symbol, i.e., has no inter-symbol-interferences. Thus, fractionally spaced samples, such as half a symbol away, have some spread in amplitude, even with no noise present, due to the randomness of nearly transmitted data.) The following TABLE provides a list of standard deviations (in microseconds) on a per-slot basis of the variance of the statistic. Note that this table is based on assumed random data, so that about half of the symbols in such data have appropriate phase transitions.

TABLE

| Signal-to-Noise Ratio (C/N) [ dB] | Standard Deviation [µS] |
|---|---|
| 0. | 10.3 |
| 5. | 2.80 |
| 10. | 1.96 |
| infinite | 0.82 |

Because symbol timing determination is unimportant if data cannot be demodulated accurately, even with perfect symbol timing, it is reasonable to limit consideration of symbol timing to slots received with adequate signal-to-noise ratios. With differential modulation, no rate-one-half coding provides reasonable error rates at a 5 dB signal-to-noise ratio, and 5 dB is a reasonable worse-case assumption for the signal-to-noise ratio with which the present embodiment must perform symbol timing determination.

The side information consists of two estimated statistics: (a) the signal-to-noise ratio within the slot, which is estimated by a signal-to-noise ratio estimator; and (b) cyclic redundancy check (CRC) failure rate. (Cyclic redundancy checks are well known in the art.) The signal-to-noise ratio is estimated by the signal-to-noise ratio estimator as follows:

Received symbols are: z(n), where n is approximately equal to 40 symbols per frame. Normalized "differential" symbols are created as follows:

$$x(n) = \frac{z(n) \cdot z^*(n-1)}{|z(n)| \cdot |z(n-1)|}$$

$x_d(n)$ minus the expected (decision) values of x(n) is used in the signal-to-noise ratio estimate as follows:

$$SNR_{est} = \frac{1}{\left[ \sum_n |x_d(n) - x(n)|^2 \right]}$$

$$NSR_{est} = \left[ \sum_n |x_d(n) - x(n)|^2 \right]$$

The value of the signal-to-noise ratio estimate $SNR_{est}$, as related to improvement in the estimate of symbol timing, is a function of how the current estimate relates to the average of such estimates. In fading environments, individual received bursts may vary greatly in signal-to-noise ratio. To improve the performance of symbol timing estimation, the information associated with bursts with high signal-to-noise ratio should be weighted more highly. A determination as to which bursts have "high" signal-to-noise ratio is made by comparing the signal-to-noise radio estimate of each burst with an average signal-to-noise ratio estimate using a weighting evaluator 19. To enable a comparison of the current estimate to the average of such estimates to be made, the average of the signal-to-noise ratio estimates is maintained by an averager 16 as follows, where (for convenience of less complex calculations) the noise-to-signal ratio $NSR_{est}$ forms the basis of all estimates:

$$NSR_{ave} = (1 - K_{nsr}) \cdot NSR_{ave} + K_{nsr} \cdot NSR_{est}; [\text{where } K_{nsr} \approx 0.05, \text{ say}]$$

A next reception time determiner 17 determines the time until a next reception in response to the confidence level from a confidence level estimator 14. The confidence level estimator 14 determines whether the average noise-to-signal ratio has fallen below one of several thresholds. Assuming that many bursts are available other than those that potentially may contain pages, the next reception determiner 17 can demand that additional bursts be received in order to help keep symbol timing accurate. Such additional bursts are demanded by the next reception determiner 17 when the confidence level from the confidence level estimator indicates that the average noise-to-signal ratio $NSR_{ave}$ has fallen below one of the several thresholds. The several thresholds are preferably each indicative of a specified interval between received bursts, i.e., an interval between periods during which the present embodiment is "awake" or in active mode. Such interval may range from, for example, 10 seconds (in low average noise-to-signal ratio environments) to 160 milliseconds (in high noise-to-signal ratio environments).

The weighting evaluator 19 receives the signal-to-noise ratio estimate $SNR_{est}$ and the average signal-to-noise ratio from the signal-to-noise ratio estimator 12 and the averager 16, respectively. The weighting evaluator 19 determines the degree to which the current statistic (t_stat) should be taken seriously by performing an instantaneous comparison of instantaneous noise-to-signal ratio with the average noise-to-signal ratio and makes an adjustment to the bandwidth $K_{BW}$ of the control loop in response to such determination, i.e., makes the control loop more responsive to recent data if the instantaneous noise-to-signal radio indicates a relatively low noise environment and makes the control loop less responsive to recent data if the instantaneous noise-to-signal ratio indicates a relatively high noise environment.

Figure 2:
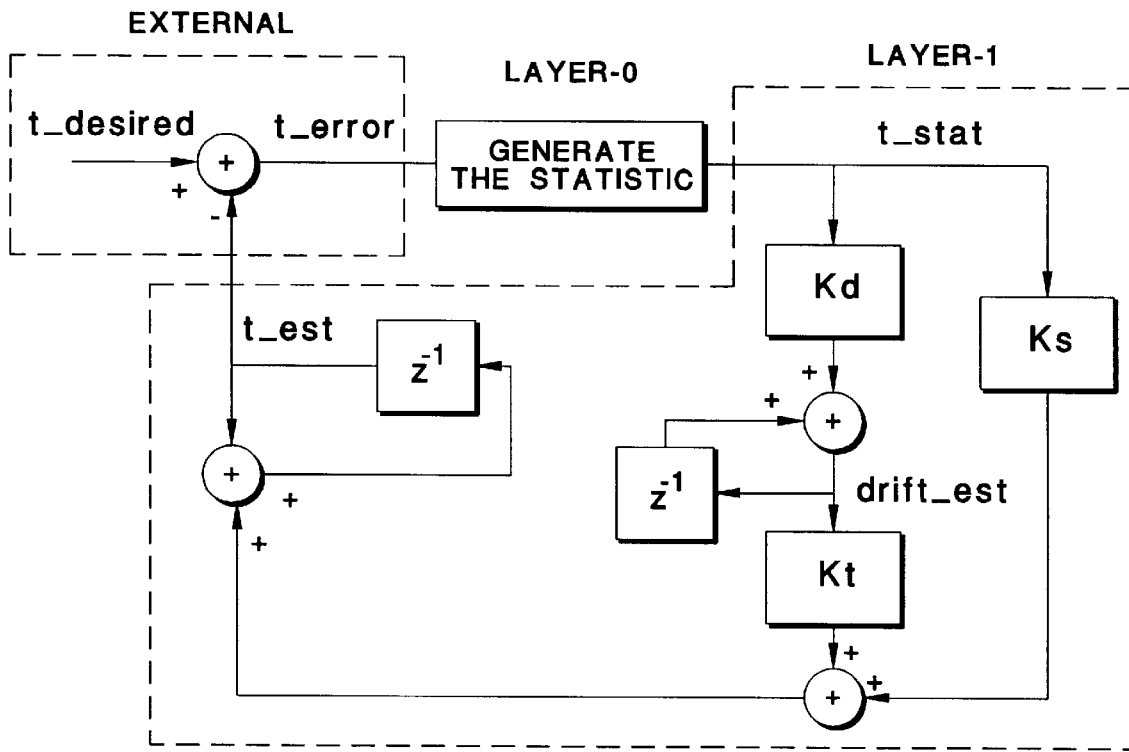
FIG. 2 is a block diagram of a control loop that is applied to filter a statistic (t_stat) in order to generate an estimate (t_est) of a desired symbol timing (t_desire) in the embodiment of FIG. 1.

Referring to Layer 1 and to FIG. 2, a control loop is illustrated that is applied to filter the statistic (t_stat) in order to generate an estimate (t_est) of the desired symbol timing (t_desired). The statistic (t_stat) and the estimate (t_est) are utilized externally (i.e., by other systems within the subscriber unit) to adjust the symbol timing employed by the subscriber unit. (The subscriber unit may be a cellular telephone, a satellite transceiver, a pager, or the like.)

The comparison of the estimate (t_est) with the desired symbol timing (t_desired) occurs outside the symbol timing control mechanism of the present embodiment. Such comparison is performed implicitly, as the desired symbol timing (t_desired) is implicitly contained in the received signal, and the effects of the timing error (t_error) are seen after the estimated symbol timing (t_est) is applied to the received signal.

Figure 3:
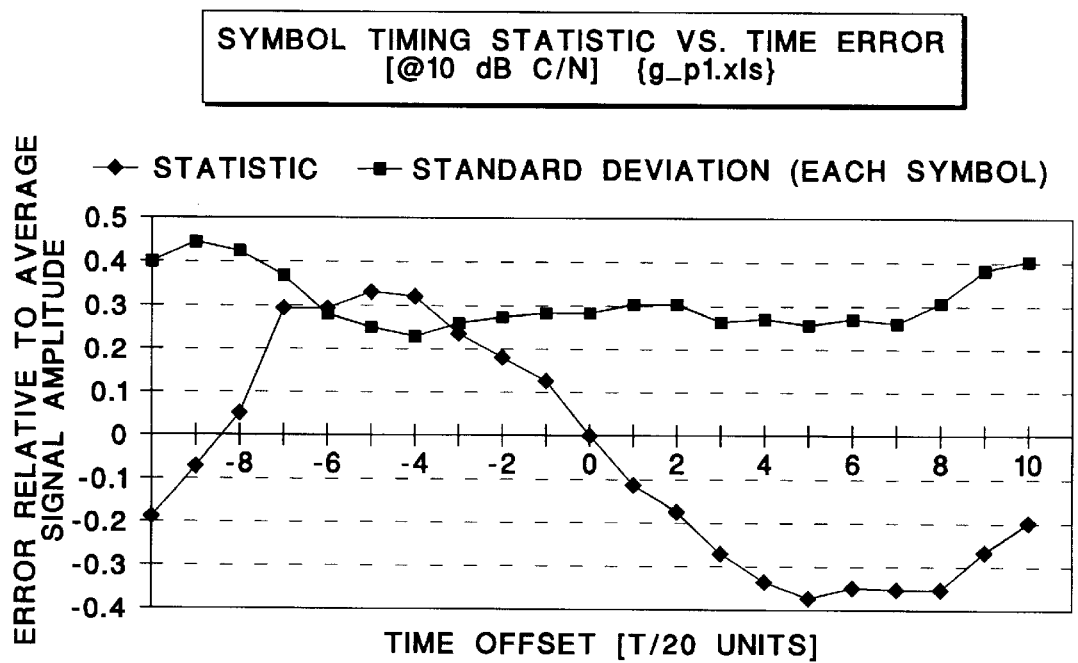
FIG. 3 is a graph illustrating a non-linear function that relates the statistic (t_stat) filtered by the control loop of FIG. 2 to timing error (t_error), as well as the statistic's standard deviation per symbol.

The statistic (t_stat) is related to timing error (t_error) by a non-linear function. For the case of a 10 dB signal-to-noise ratio, FIG. 3 illustrates the form of this non-linear function, as well as the statistic's standard deviation per symbol.

Figure 4:
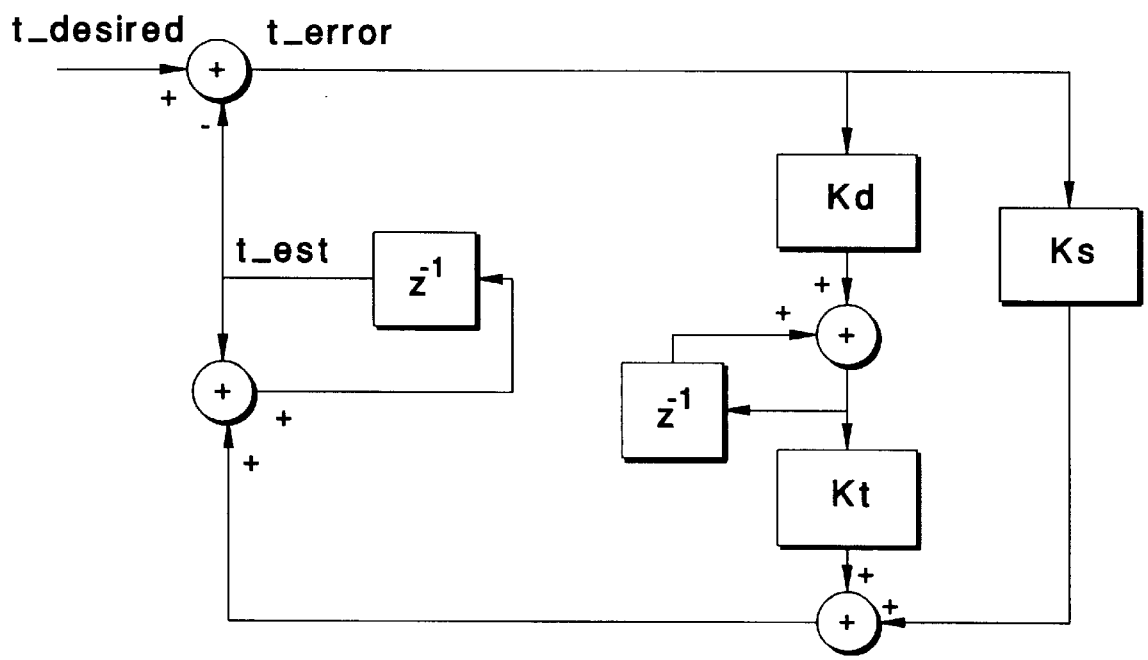
FIG. 4 is a block diagram of a linearized version of the control loop of FIG. 2.

FIG. 4 outlines a simplified (i.e., linearized) model of the control loop. From this simplified model, the characteristics of the control loop 18, in terms of pole and zero locations, and frequency response can be determined. The following is a determination of the pole and zero locations of the simplified model for the transfer function t_est(n)/t_desired (n):

From the below equations, the poles and zeros can be determined by equating the numerator and denominator of the transfer function to zero. The zero's are:

$$z^2\{K_s \cdot + K_d \cdot K_t\} + z^1 \cdot \{-K_s\} = 0$$

$$z \cdot [z \cdot (K_s + K_d \cdot K_t) - K_s] = 0$$

$$\rightarrow z = 0; \text{ or } z \cdot (K_s + K_d \cdot K_t^*) = K_s$$

$$z = \frac{K_s}{K_s + K_d \cdot K_t}$$

and poles are:

$$z^2\{1\} + z^1\{K_d \cdot K_t + K_s - 2\}1 + z^0\{-K_s + 1\} = 0$$

$$a = 1$$

$$b = K_d \cdot K_t + K_s - 2$$

$$c = K_s + 1$$

$$z = \frac{-b \pm \sqrt{b^2 - 4ac}}{2a}$$

$$= \frac{-K_d \cdot K_t - K_s + 2 \pm \sqrt{(K_d \cdot K_t + K_s - 2)^2 - 4(-K_s + 1)}}{2}$$

For example, if $K_d K_t$ equals 0.1 and $K_s$ equals 0.2, poles are at $0.85 \pm j(0.278)$, and zeros are at 0 and 0.66. Frequency response to this system is illustrated in FIG. 5.

Referring back to FIG. 4, selection of parameters $K_d$ and $K_s$ is based on a tradeoff between response time, i.e., the time required to recover from some timing error to within some defined error window (for example, the time required to get from a 10 ms error to less than 2 ms error); and steady state timing error at some signal-to-noise ratio (for example, it may be desirable to maintain less than 1 ms standard deviation of error at 5 dB signal-to-noise ratio).

In order to account for "confidence" in the quality of information from individual slots, the bandwidth of the control loop 18 (shown in FIGS. 1, 2 and 4) can be varied on a slot-by-slot basis, such that confidence information will not impact timing estimates. In the context of the present embodiment, "bandwidth" refers to a period over which the control loop evaluates samples in order to determine the timing error (t_error). "Tighter" bandwidth results in a more solid determination of timing error (t_error), i.e., a determination of timing error (t_error) that is less susceptible to high noise environments, but less responsive to real changes in symbol timing that should be tracked, whereas "looser" bandwidth is more susceptible to high noise environments but also more responsive to real changes in symbol timing that should be tracked.

To implement slot-by-slot variation, requires a mapping of the $NSR_{est}$ and of $K_{bw}$, which is controlled by Layer 2.

Figure 6:
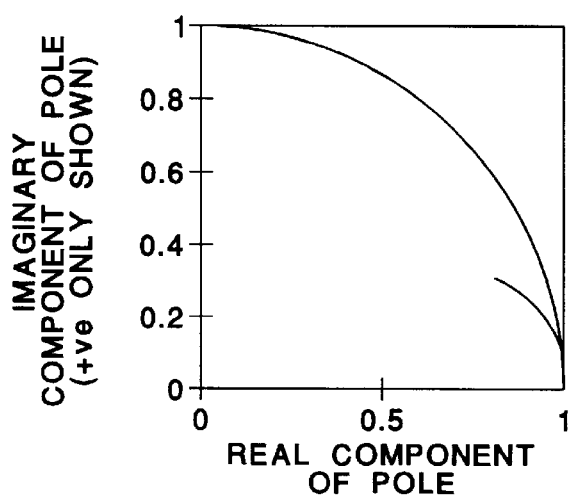
FIG. 6 is an illustration of the effect of a loop bandwidth $K_{bw}$ of the control loop of FIG. 4 on the location of a pole in the upper half of the z-plane, as the loop bandwidth $K_{bw}$ varies from 0.1 to 1.0.

Referring to Layer 2, the bandwidth of the control loop can be modified by a Bandwidth Tuner 20 that multiplies both $K_s$ and $K_d$ by a factor $K_{bw}$. As such, the factor $K_{bw}$ directly controls the bandwidth of the control loop. The Bandwidth Tuner 20 is coupled to a memory 22 that records the factor $K_{bw}$, which record is used to perform local filtering of the factor $K_{bw}$. The Bandwidth Tuner 20 controls the Set Bandwidth System 24 for the control loop. FIG. 6 illustrates the effect of $K_{bw}$ on the location of the pole in the upper half of the z-plane, as $K_{bw}$ varies from 0.1 to 1.0. With $K_{bw}$ set to 0.1, frequency response of the loop is narrowed as shown in FIG. 7.

Referring to Layer 3, in the event a decoder 26 coupled to the receiver detects numerous cyclic redundancy check (CRC) failures, the possibility that symbol timing synchronization has been lost must be evaluated by a Synchronization Loss Determination System 28 and possibly corrected by a Power-up Timing Acquisition System 30 (Layer 4). The Synchronization Loss Determination System 28 is coupled to a memory 29 that records a history of CRC failures that is used to determine when attempts to resynchronize without full power-up-style reacquisition are appropriate and when attempts to resynchronize using full power-up-style reacquisition are needed.

It is first assumed that the timing error is only a symbol or two in duration. In such case, the modem 10 is notified, and the demodulator 10 switches to a more complex "search" mode, wherein the demodulator 10 "looks" over a time window (of perhaps four symbols in duration) for (a) the best signal-to-noise ratio, and (b) a "passed" cyclic redundancy check.

The more "complex" search mode involves searching over a "wider" time window, and can take a number of forms, depending on characteristics the available bursts. For example, a number of time offsets can be hypothesized, and demodulation attempted for each one. A cyclic redundancy check is performed for each hypothesized time offset and the best hypothesized time offset is selected. Alternatively, if bursts with a known sequence are available, corrections with the known sequence and the sequence actually received (with current symbol timing) can be performed and the extent of the error in the current symbol timing can be determined using known techniques.

If the more complex "search" mode consistently fails to achieve resynchronization, i.e., if resynchronization is not achieved after a prescribed number of attempts, then control is passed outside of Layer 3 to Layer 4 wherein full "power-up"-style reacquisition is performed by the Power-up Timing Acquisition System 30 using heretofore known "power-up"-style reacquisition techniques.

Figure 8:
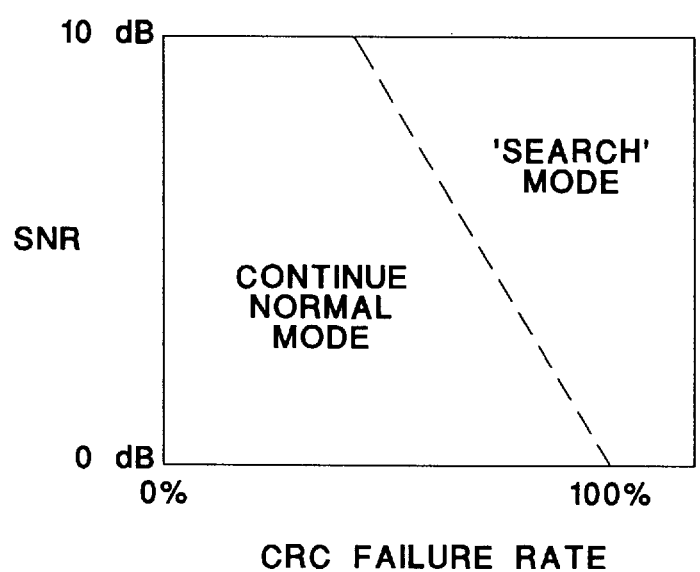
FIG. 8 is a graph illustrating, for one variation of the embodiment of FIG. 1, decision regions that can be applied by a Synchronization Loss Determination System.

The decision to switch the modem into "search" mode is dependent upon (a) how often the "search" mode has been attempted since acceptable reception was received, and (b) a relationship between the cyclic redundancy check failure rate, and the estimated signal-to-noise ratio. In the event that the cyclic redundancy check failures are attributable to poor signal quality, the decision to switch to "search" mode is delayed for a longer period than if good signal quality is perceived. FIG. 8 illustrates, for one embodiment, decision regions that can be applied by the Synchronization Loss Determination System 28.

Referring to layer 4, conventional power-up-style reacquisition is performed by the Power-up Timing Acquisition System 30 in order to obtain timing synchronization when no useful signaling is observed, i.e., when a "no service" indicator on the subscriber unit would be illuminated. Such power-up-style reacquisition or resynchronization is performed using heretofore well known techniques.

While the invention herein disclosed has been described by means of specific embodiments and applications thereof, numerous modifications and variations could be made thereto by those skilled in the art without departing from the scope of the invention set forth in the claims.

What is claimed is:

1. A system for symbol timing maintenance in a communications receiver comprising:

a receive channel, including a demodulator and an analog-to-digital converter for demodulating and digitizing a received signal, respectively, and for generating a plurality of samples in response thereto;

a symbol timing statistic generator for generating a symbol timing statistic related to actual timing error in response to a portion of the plurality of samples, the symbol timing statistic generator being coupled to the receive channel;

a noise estimator for generating an estimate of a noise level in response to the plurality of samples, the noise estimator being coupled to the receive channel; a reception interval determiner for determining a reception interval of the receive channel based upon a relative signal-to-noise ratio generated from a portion of the plurality of samples, the reception interval determiner being coupled to the noise estimator and to the receive channel; and a control loop for generating a signal indicative of symbol timing error in response to the symbol timing statistic, the control loop being coupled to the symbol timing statistic generator and to the reception interval determiner.

2. The system of claim 1 further comprising:

a confidence estimator for determining a symbol timing estimate confidence level in response to said estimate of said noise level having been generated, the confidence estimator being coupled to said noise estimator and said reception interval determiner being coupled to said noise estimator through the confidence estimator;

an averager for averaging said estimate of said noise level having been generated, the averager being coupled to said noise estimator and to said confidence estimator;

said confidence estimator determining said symbol timing estimate confidence level in response to said estimate of said noise level having been generated, and in response to the averaging of said noise level having been generated.

3. The system of claim 1 further comprising:

a synchronization loss determiner for determining whether signal timing synchronization has been lost and for signalling said demodulator to initiate a complex "search" mode in the event the signal timing synchronization has been lost, the synchronization loss determiner being coupled to said noise estimator, and the determining of whether signal timing synchronization has been lost being in response to said estimate of said noise level.

4. The system of claim 3 further comprising:

a power-up-style reacquisition system for performing a power-up-style reacquisition of said symbol timing synchronization, the power-up-style reacquisition system being coupled to said synchronization loss determiner;

said synchronization loss determiner including means for determining whether said complex "search" mode has failed to achieve said symbol timing synchronization, and for signalling the power-up-style reacquisition system to perform the power-up-style reacquisition in the event said complex "search" mode is determined to have failed to achieve said symbol timing synchronization.

5. The system of claim 4 further including:

a decoder for performing an error check on said portion of said plurality of samples, and for signalling to said synchronization loss determiner results of said error check, said decoder being coupled to said demodulator;

said synchronization loss determiner including means for determining whether said signal timing synchronization has been lost in response to both said estimate of said noise level, and the error check on said portion of said plurality of samples.

6. The system of claim 5 wherein said means for determining whether said complex "search" mode has failed to achieve said symbol timing synchronization includes means for utilizing both said noise level and said error check on said portion of said plurality of samples in said determining of whether said complex "search" mode has failed to achieve said symbol timing synchronization.

7. The system of claim 1 further comprising:

a bandwidth tuner for tuning a bandwidth of the control loop in response to said signal indicative of said symbol timing error having been generated.

8. A system for symbol timing maintenance in a communications receiver comprising:

a receive channel, including a demodulator and an analog-to-digital converter for demodulating and digitizing a received signal, respectively, and for generating a plurality of samples in response thereto;

a symbol timing statistic generator for generating a symbol timing statistic related to actual timing error in response to a portion of the plurality of samples, the symbol timing statistic generator being coupled to the receive channel;

a control loop for generating a signal indicative of symbol timing error in response to the symbol timing statistic, the control loop being coupled to the symbol timing statistic generator; and a bandwidth tuner for tuning a bandwidth of the control loop in response to the signal indicative of the symbol timing error having been generated.

9. The system of claim 8 further comprising:

a noise estimator for generating an estimate of a noise level in response to the plurality of samples, the noise estimator being coupled to the receive channel;

a confidence estimator for determining a symbol timing estimate confidence level in response to said estimate of said noise level having been generated, the confidence estimator being coupled to said noise estimator;

an averager for averaging said estimate of said noise level having been generated, the averager being coupled to said noise estimator and to said confidence estimator;

said confidence estimator determining said symbol timing estimate confidence level in response to said estimate of said noise level having been generated, and in response to the averaging of said noise level having been generated.

10. The system of claim 9 further comprising:

a synchronization loss determiner for determining whether signal timing synchronization has been lost and for signalling said demodulator to initiate a complex "search" mode in the event the signal timing synchronization has been lost, the synchronization loss determiner being coupled to said noise estimator, and the determining of whether signal timing synchronization has been lost being in response to said estimate of said noise level.

11. The system of claim 10 further comprising:

a power-up-style reacquisition system for performing a power-up-style reacquisition of said symbol timing synchronization, the power-up style reacquisition system being coupled to said synchronization loss determiner;

said synchronization loss determiner including means for determining whether said complex "search" mode has failed to achieve said symbol timing synchronization, and for signalling the power-up style reacquisition system to perform the power-up style reacquisition in the event said complex "search" mode is determined to have failed to achieve said symbol timing synchronization.

12. The system of claim 11 further including:

a decoder for performing an error check on said portion of said plurality of samples, and for signalling to said synchronization loss determiner results of said error check, said decoder being coupled to said demodulator;

said synchronization loss determiner including means for determining whether said signal timing synchronization has been lost in response to both said estimate of said noise level, and the error check on said portion of said plurality of samples.

13. The system of claim 12 wherein said means for determining whether said complex "search" mode has failed to achieve said symbol timing synchronization includes means for utilizing both said noise level and said error check on said portion of said plurality of samples in said determining of whether said complex "search" mode has failed to achieve said symbol timing synchronization.

14. The system of claim 8 wherein said control loop includes means for generating a signal indicative of a signal timing estimate.

15. A method for symbol timing maintenance in a communications receiver, comprising:

receiving a receiver signal into a receive channel;

demodulating the receiver signal;

digitizing the receiver signal, and generating a plurality of samples in response thereto;

generating a symbol timing statistic related to actual timing error in response to a portion of a plurality of samples;

generating an estimate of a noise level in response to the plurality of samples;

determining a reception interval in response to the estimate of the noise level; and generating a signal indicative of a symbol timing error in response to the symbol timing statistic.

16. The method of claim 15 further comprising:

averaging said estimate of said noise level and generating a noise level average in response thereto; and determining a symbol timing estimate confidence level in response to said estimate of said noise level and in response to the noise level average.

17. The method of claim 15 further comprising:

determining, in response to said estimate of said noise level, whether symbol timing synchronization has been lost; and signalling said demodulator to initiate a complex search mode in the event the symbol timing synchronization has been lost.

18. The method of claim 17 further comprising:

determining whether said complex search mode has failed to achieve said symbol timing synchronization; and signalling a power-up style reacquisition system to perform a power-up style reacquisition in the event said complex search mode is determined to have failed to achieve said symbol timing synchronization.

19. The method of claim 18 further comprising:
performing an error check on said portion of said plurality of samples;
signalling results of said error check; and
determining, in response to both said estimate of said noise level and the error check on said portion of said plurality of samples, whether said symbol timing synchronization has been lost.

20. The method of claim 15 further comprising:
tuning a bandwidth of a control loop in response to said signal indicative of said symbol timing error.

21. A method for symbol timing maintenance in a communications receiver comprising:
receiving a receiver signal into the communications receiver;
demodulating the receiver signal;
digitizing the receiver signal and generating a plurality of samples in response thereto;
generating a symbol timing statistic related to actual timing error in response to a portion of the plurality of samples;
generating a signal indicative of symbol timing error in response to the symbol timing statistic; and
tuning a bandwidth of a control loop in response to a relative noise-to-signal ratio generated from a second portion of the plurality of samples from the signal indicative of the symbol timing error in response to the symbol timing statistic.

22. The method of claim 21 further comprising:
generating an estimate of a noise level in response to the plurality of samples;
averaging the estimate of the noise level; and
determining a symbol timing estimate confidence level in response to the estimate of said noise level in response to said estimate of said noise level.

23. The method of claim 22 further comprising:
determining, in response to said estimate of said noise level, whether said signal timing synchronization has been lost; and
signalling said demodulator to initiate a complex search mode in the event the signal timing synchronization has been lost.

24. A system for symbol timing maintenance in a communications receiver comprising:
a receive channel, including a demodulator and an analog-to-digital converter for demodulating and digitizing a received signal, respectively, and for generating a plurality of samples in response thereto;
a symbol timing statistic generator for generating a symbol timing statistic related to actual timing error in response to a portion of the plurality of samples, the symbol timing statistic generator being coupled to the receive channel;
a noise estimator for generating an estimate of a noise level in response to the plurality of samples, the noise estimator being coupled to the receive channel; a reception interval determiner for determining a reception interval of the receive channel based upon a relative signal-to-noise ratio generated from a portion of the plurality of samples, the reception interval determiner being coupled to the noise estimator and to the receive channel;
a control loop for generating a signal indicative of symbol timing error in response to the symbol timing statistic, the control loop being coupled to the symbol timing statistic generator and to the reception interval determiner;
a confidence estimator for determining symbol timing estimate confidence level in response to said estimate of said noise level having been generated, confident estimator being coupled to said noise estimator and said reception interval being coupled to said noise estimator through the confidence estimator; and
an averager for averaging said estimate of said noise level having been generated, the averager being coupled to said noise estimator and to said confidence estimator, said confidence estimator determining said symbol timing estimate confidence level in response to said estimate of said noise level having been generated, and in response to the averaging of said noise level having been generated.

25. A system for symbol timing maintenance in a communications receiver comprising:
a receive channel, including a demodulator and an analog-to-digital converter for demodulating and digitizing a received signal, respectively, and for generating a plurality of samples in response thereto;
a symbol timing statistic generator for generating a symbol timing statistic related to actual timing error in response to a portion of the plurality of samples, the symbol timing statistic generator being coupled to the receive channel;
a noise estimator for generating an estimate of a noise level in response to the plurality of samples, the noise estimator being coupled to the receive channel; a reception interval determiner for determining a reception interval of the receive channel based upon a relative signal-to-noise ratio generated from a portion of the plurality of samples, the reception interval determiner being coupled to the noise estimator and to the receive channel;
a control loop for generating a signal indicative of symbol timing error in response to the symbol timing statistic, the control loop being coupled to the symbol timing statistic generator and to the reception interval determiner; and
a synchronization loss determiner for determining whether signal timing synchronization has been lost and for signalling said demodulator to initiate a complex "search" mode in the event the signal timing synchronization has been lost, the synchronization loss determiner being coupled to said noise estimator, and the determining of whether signal timing synchronization has been lost being in response to said estimate of said noise level.

26. A system for symbol timing maintenance in a communications receiver comprising:
a receive channel, including a demodulator and an analog-to-digital converter for demodulating and digitizing a received signal, respectively, and for generating a plurality of samples in response thereto;
a symbol timing statistic generator for generating a symbol timing statistic related to actual timing error in response to a portion of the plurality of samples, the symbol timing statistic generator being coupled to the receive channel;
a noise estimator for generating an estimate of a noise level in response to the plurality of samples, the noise estimator being coupled to the receive channel; a reception interval determiner for determining a reception interval of the receive channel based upon a relative signal-to-noise ratio generated from a portion of the plurality of samples, the reception interval determiner being coupled to the noise estimator and to the receive channel;

a control loop for generating a signal indicative of symbol timing error in response to the symbol timing statistic, the control loop being coupled to the symbol timing statistic generator;

a bandwidth tuner for tuning a bandwidth of the control loop in response to the signal indicative of the symbol timing error having been generated;

a confidence estimator for determining a symbol timing estimate confidence level in response to said estimate of said noise level having been generated, the confidence estimator being coupled to said noise estimator and said reception interval determiner being coupled to said noise estimator through the confidence estimator; and an averager for averaging said estimate of said noise level having been generated, the averager being coupled to said noise estimator and to said confidence estimator, said confidence estimator determining said symbol timing estimate confidence level in response to said estimate of said noise level having been generated, and in response to the averaging of said noise level having been generated.

27. A system for symbol timing maintenance in a communications receiver comprising:

a receive channel, including a demodulator and an analog-to-digital converter for demodulating and digitizing a received signal, respectively, and for generating a plurality of samples in response thereto;

a symbol timing statistic generator for generating a symbol timing statistic related to actual timing error in response to a portion of the plurality of samples, the symbol timing statistic generator being coupled to the receive channel;

a noise estimator for generating an estimate of a noise level in response to the plurality of samples, the noise estimator being coupled to the receive channel; a reception interval determiner for determining a reception interval of the receive channel based upon a relative signal-to-noise ratio generated from a portion of the plurality of samples, the reception interval determiner being coupled to the noise estimator and to the receive channel;

a control loop for generating a signal indicative of symbol timing error in response to the symbol timing statistic, the control loop being coupled to the symbol timing statistic generator;

a bandwidth tuner for tuning a bandwidth of the control loop in response to the signal indicative of the symbol timing error having been generated; and a synchronization loss determiner for determining whether signal timing synchronization has been lost and for signalling said demodulator to initiate a complex "search" mode in the event the signal timing synchronization has been lost, the synchronization loss determiner being coupled to said noise estimator, and the determining of whether signal timing synchronization has been lost being in response to said estimate of said noise level.

28. A method for symbol timing maintenance in a communications receiver, comprising:

receiving a receiver signal into a receive channel;

demodulating the receiver signal;

digitizing the receiver signal, and generating a plurality of samples in response to thereto;

generating a symbol timing statistic related to actual timing error in response to a portion of a plurality of samples;

generating an estimate of a noise level in response to the plurality of samples;

determining a reception interval in response to the estimate of the noise level;

generating a signal indicative of a symbol timing error in response to the symbol timing statistic;

averaging said estimate of said noise level; and determining said symbol timing estimate confidence level in response to said estimate of said noise level, and in response to the averaging of said noise level.

29. A method for symbol timing maintenance in a communications receiver, comprising:

receiving a receiver signal into a receive channel;

demodulating the receiver signal;

digitizing the receiver signal, and generating a plurality of samples in response to thereto;

generating a symbol timing statistic related to actual timing error in response to a portion of a plurality of samples;

generating an estimate of a noise level in response to the plurality of samples;

determining a reception interval in response to the estimate of the noise level;

generating a signal indicative of a symbol timing error in response to the symbol timing statistic;

determining whether signal timing synchronization has been lost in response to said estimate of said noise level; and signalling said demodulator to initiate a complex "search" mode in the event the signal timing synchronization has been lost.

30. A method for symbol timing maintenance in a communications receiver comprising:

receiving a receiver signal into the communications receiver;

demodulating the receiver signal;

digitizing the receiver signal and generating a plurality of samples in response thereto;

generating a symbol timing statistic related to actual timing error in response to a portion of the plurality of samples;

generating an estimate of a noise level in response to the plurality of samples;

generating a signal indicative of symbol timing error in response to the symbol timing statistic; and tuning a bandwidth of a control loop in response to a relative noise-to-signal ratio generated from a second portion of the plurality of samples from the signal indicative of the symbol timing error in response to the symbol timing statistic;

averaging said estimate of said noise level; and determining said symbol timing estimate confidence level in response to said estimate of said noise level, and in response to the averaging of said noise level.

31. A method for symbol timing maintenance in a communications receiver comprising:

receiving a receiver signal into the communications receiver;

demodulating the receiver signal;

digitizing the receiver signal and generating a plurality of samples in response thereto;

generating a symbol timing statistic related to actual timing error in response to a portion of the plurality of samples;

generating an estimate of a noise level in response to the plurality of samples;

generating a signal indicative of symbol timing error in response to the symbol timing statistic; and tuning a bandwidth of a control loop in response to a relative noise-to-signal ratio generated from a second portion of the plurality of samples from the signal indicative of the symbol timing error in response to the symbol timing statistic;

determining whether signal timing synchronization has been lost in response to said estimate of said noise level; and signalling said demodulator to initiate a complex "search" mode in the event the signal timing synchronization has been lost.

* * * * *